United States Patent [19]
Shim

[11] Patent Number: 5,805,483
[45] Date of Patent: Sep. 8, 1998

[54] METHOD OF CONVERTING DATA OUTPUTTING SEQUENCE IN INVERSE DCT AND CIRCUIT THEREOF

[75] Inventor: Dae-yun Shim, Seoul, Rep. of Korea

[73] Assignee: Samsung Electronics Co., Ltd., Kyungki-Do, Rep. of Korea

[21] Appl. No.: 581,225

[22] Filed: Dec. 29, 1995

[30] Foreign Application Priority Data

Dec. 13, 1995 [KR] Rep. of Korea ................. 1995-49182

[51] Int. Cl.$^6$ .................................................. G06F 17/14
[52] U.S. Cl. .............................. 364/725.03; 364/725.01
[58] Field of Search ..................... 364/725.01, 725.03; 382/233, 250, 270; 711/165, 168, 169

[56] References Cited

U.S. PATENT DOCUMENTS 5,379,351 1/1995 Fandrianto et al. ...................... 382/250
5,673,214 9/1997 Kim et al. ................................. 382/250

*Primary Examiner*—Tan V. Mai
*Attorney, Agent, or Firm*—Sughrue, Mion, Zinn, Macpeak & Seas, PLLC

[57] ABSTRACT

A data outputting sequence converting method and circuit is disclosed which employs an inverse discrete cosine transform (IDCT) for matching the sequences of a picture signal output from an inverse IDCT unit and those output from a motion compensator in a moving picture coding apparatus. The circuit includes a memory for storing the IDCT-performed data packed in a predetermined unit, a write controller for generating a write address and a write control signal for controlling the operation of writing the IDCT-performed data in said memory and generating a read request signal if the write operation is completed. The circuit also includes a read controller for receiving an accept signal in response to the read request signal and generating a read address and a read control signal for reading the IDCT-performed data from the memory. Since the sequences of a picture signal output from an inverse IDCT and those output from a motion compensator are united by an address mapping method, a separate format converter is not required, thus, post-processing complexity is relieved. Also, the circuit always operates without a processing delay due to the time gap between the request operation and accept operation. A simplified interfacing circuit is provided by mapping a luminance output signal and a chrominance output signal, and a compact hardware implementation can be achieved.

10 Claims, 13 Drawing Sheets

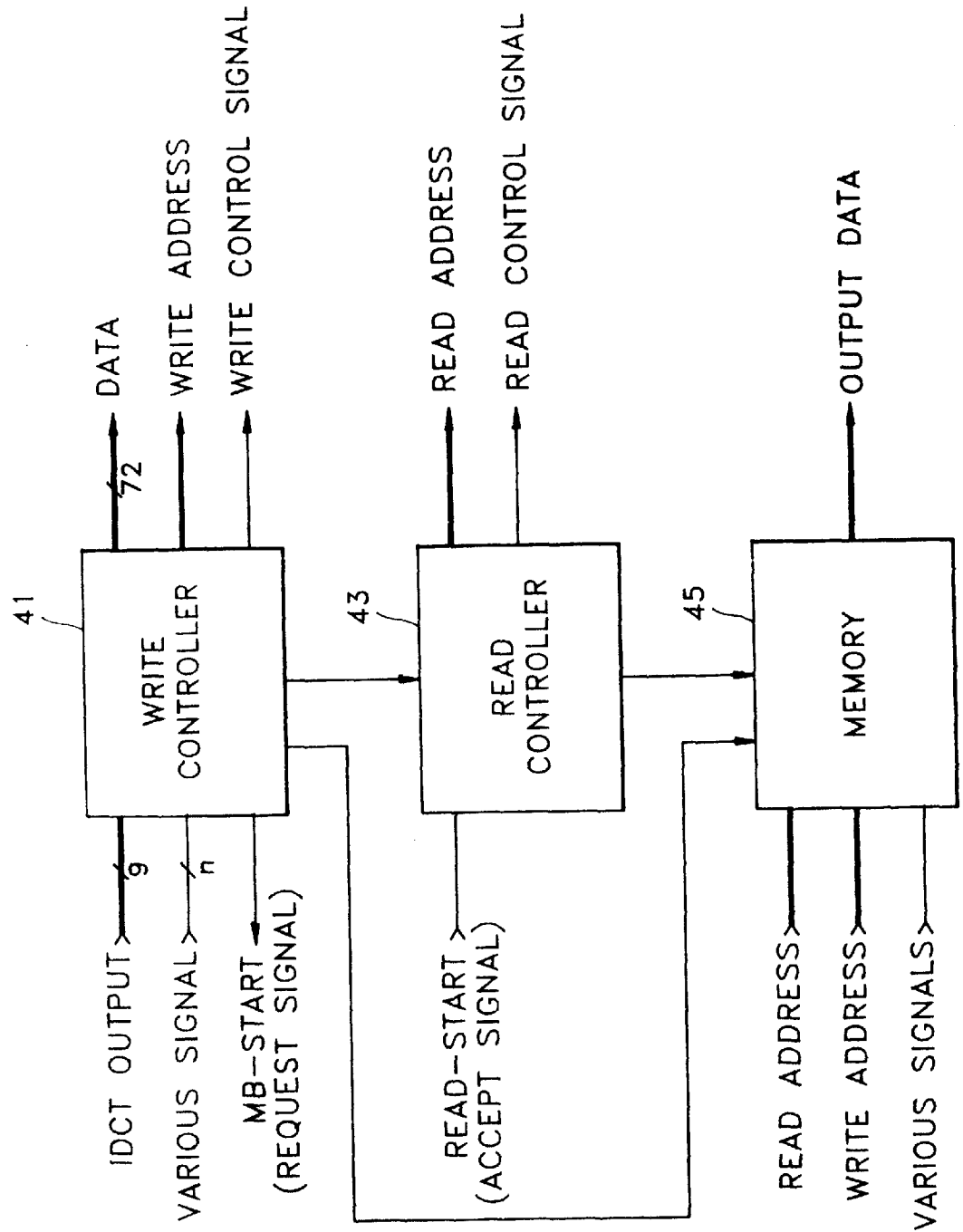

METHOD OF CONVERTING DATA OUTPUTTING SEQUENCE IN INVERSE DCT AND CIRCUIT THEREOF

BACKGROUND OF THE INVENTION

1. Field of the Invention

The present invention relates to an inverse discrete cosine transform (IDCT), and more particularly, to a data outputting sequence converting method and circuit for compensating motion of IDCT-performed picture data.

2. Description of Related Art

The storage media or picture transmission systems which are being widely adopted, employ analog methods. If these analog methods are converted to digital methods, the picture quality, reliability and ease of data processing can be improved, since the research thereabout has actively progressed. Such video signal digital processing technology is already adopted in high definition television (HDTV), digital video cassette recorder (DVCR) and video conference systems, and the fields to which it can be applied will continue to increase.

However, since a digital signal processing system requires a great deal of information data, data compression becomes necessary in order to efficiently utilize transmission channels and storage media. The task of establishing international standards for a moving picture coding method has progressed vigorously, led by the Moving Picture Experts Group (MPEG).

A general technique for compressing a picture signal is efficiently performed by removing surplus information using spatial or temporal correlation, and variable-length coding the same. A typical compression technique is an entropy coding method using a motion compensated discrete-cosine transform (DCT) shown in FIG. 1, which has been adopted by the MPEG in recommending international standards for encoding moving pictures.

A general moving picture encoder will now be described briefly with reference to FIG. 1.

In FIG. 1, a frame reorder 1 receives a source picture signal and performs a color-coordinate-conversion sub-sampling or block partition to reorder frames. A first field/frame memory 2 stores the picture signal output from frame reorder 1 in units of a field in the case of interframe coding, or stores the picture signal output from frame reorder 1 in units of a frame in the case of intraframe coding. A subtractor 3 subtracts the previous motion-compensated picture signal, which is output from an adaptive predictor 10, from the current picture signal which is in units of a field or a frame and is output from first field/frame memory 2, to output a difference picture signal. A DCT unit 4 performs a DCT operation with respect to the difference picture signal output from subtractor 3 and outputs a transform coefficient for the difference picture signal.

A quantizer (Q) 5 receives the transform coefficient output from DCT unit 4 and varies a quantization step size according to the output of a rate controller 13, to perform quantization. An inverse quantizer (IQ) 6 restores a quantized signal output from quantizer 5 into an original unquantized signal. An inverse DCT (IDCT) unit 7 restores an inverse-quantized signal output from inverse quantizer 6 into a signal which is not transformed according to DCT. An adder 8 adds the restored picture signal output from IDCT 7 to the motion-compensated picture signal output from adaptive predictor 10. A second field/frame memory 9 stores the restored picture signal output from adder 8 in units of fields or frames according to a coding mode. Adaptive predictor 10 compensates the motion index of the previous picture stored in second field/frame memory 9 based on the motion vector data and the mode data output from a motion estimator 11, and outputs the result to subtractor 3 and adder 8. Motion estimator 11 estimates the motion from the current picture and the previous picture output from first field/frame memory 2 to generate a motion vector. In order to generate the motion vector, most encoders perform a full search within a constant range in units of fixed blocks, based on a minimum absolute error (MAE). The motion vector generated by motion estimator 11 is output to adaptive predictor 10 and to a variable-length coder/multiplexer (VLC/MUX) 14. An activity calculator 12 calculates activities of the picture signal output from first field/frame memory 2 to output the result to rate controller 13.

Rate controller 13 multiplies a reference quantization step size, obtained depending on how much data is stored in a buffer 15, by the activity of the picture signal output from activity calculator 12 and calculates a new quantization step size to output to quantizer 5. Therefore, quantizer 5 adjusts the quantization step size depending on the output of rate controller 13 so that the output of VLC/MUX 14 may be approximated to a target bit quantity. VLC/MUX 14 variable-length codes the signal quantized by quantizer 5 and multiplexes the variable-length coded signal, the quantization parameter output from rate controller 13 and the motion vector output from motion estimator 11. Since the length of data output from VLC/MUX 14 is not constant, a buffer 15 stores the data temporarily and then transmits the same at a constant speed to the receiving end via transmission channels.

In such an entropy coding method using a motion-compensated DCT, the picture signal read from second field/frame memory 9 via a motion compensating unit, i.e., adaptive predictor 10, and the picture signal output from IDCT unit 7 are added in adder 8 to reconstruct a picture signal. In such a situation, the following problems are involved. First, since the picture signal read from second field/frame memory 9 for motion compensation is processed in units of several pixels, such as 64-bit parallel data in the case of MPEG-2, the output of IDCT unit 7 should be packed. Second, the signal output from IDCT unit 7 and the starting point for the motion compensation are not always identical. Also, in motion compensation, since time for accessing an external memory is needed, the signal output of IDCT unit 7 should be delayed. Third, since the output of IDCT unit 7 is of a field or frame format, or a field DCT or frame DCT format depending on the format of an input signal, a format converter is necessary which is suitable for the input data format of the motion compensating unit.

SUMMARY OF THE INVENTION

Therefore, it is an object of the present invention to provide a data outputting sequence converting method and circuit thereof for matching the sequences of a picture signal output from an inverse IDCT unit and an output from a motion compensator in a moving picture coding apparatus.

To accomplish the above object, according to an aspect of the present invention, there is provided a data outputting sequence converting method in an inverse discrete cosine transform (IDCT) for matching the output sequences of IDCT-performed current frame data and the restored data of a motion-compensated current frame, the method comprising the steps of: packing the IDCT-performed data for each pixel in a predetermined unit, and writing the same on a memory to generate a read request signal; generating an accept signal for the read request signal and reading the IDCT-performed data from the memory; and converting the format of the data read from said memory, wherein the steps are processed in parallel.

According to another aspect of the present invention, there is provided a data outputting sequence converting circuit in an inverse discrete cosine transform (IDCT) for matching the output sequences of IDCT-performed current frame data and restored data of a motion-compensated current frame, said circuit comprising: a memory for storing the IDCT-performed data packed in a predetermined unit; a write controlling portion for generating a write address and a write control signal for controlling the operation of writing the IDCT-performed data on the memory and generating a read request signal if the write operation is completed; and a read controlling portion for receiving an accept signal for the read request signal and generating a read address and a read control signal for reading the IDCT-performed data from the memory.

Preferably the writing step includes the concurrently performed sub-steps of generating a request signal if the IDCT-performed data is completely stored in the memory in the predetermined unit, and continuously performing a write operation to the memory, after writing a plurality of pixels for the IDCT-performed data in the memory in a predetermined unit.

Also, it is preferable that the request signal is generated when a write operation is completed for a bank, if the memory is divided into two banks and each bank is defined by six 8×8-DCT blocks.

Furthermore, preferably write addresses are sequentially ordered and read addresses are reordered.

Also, it is preferable that read addresses are sequentially ordered and write addresses are reordered.

BRIEF DESCRIPTION OF THE DRAWINGS

The above objects and advantages of the present invention will become more apparent by describing in detail a preferred embodiment thereof with reference to the attached drawings in which:

FIG. 4 is a block diagram of a data outputting sequence converting circuit according to the present invention in the IDCT unit, which illustrates the connection of various components;

DETAILED DESCRIPTION OF THE INVENTION

Figure 1:
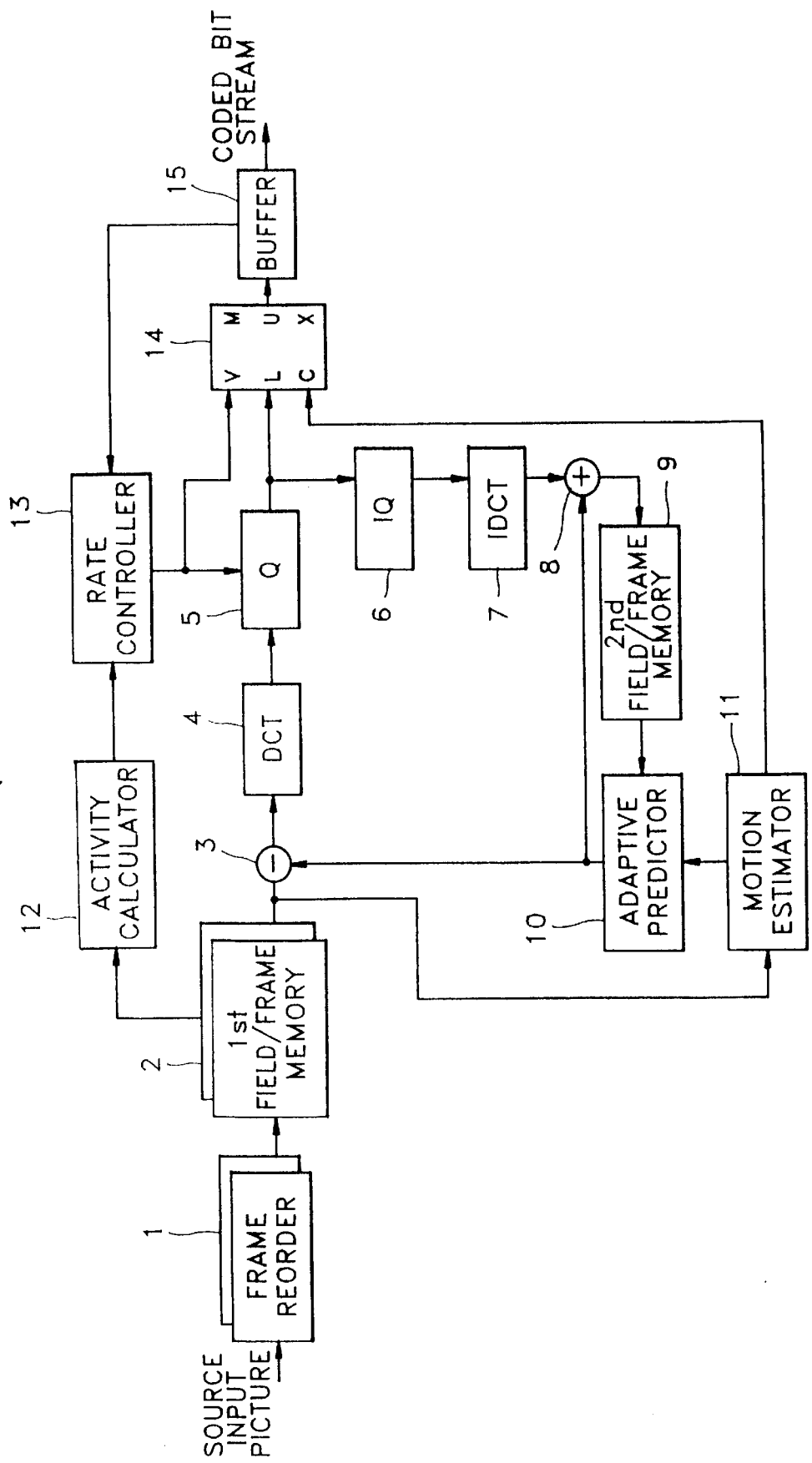
FIG. 1 is a block diagram of a general moving picture coding apparatus.

In the present invention, three operations, which are described below, progress in parallel. First, the output data of IDCT unit 7, shown in FIG. 1, is packed and then is written to a predetermined memory. Second, a read request signal for reading data from IDCT unit 7 is generated and a read accept of IDCT unit 7 is processed and read during a prescribed time. Third, the format of the data read from IDCT unit 7 is converted. A time gap between request and accept is solved by an internal buffer.

Also, the present invention is easily adopted for any type of picture data output from IDCT unit 7 and is used even in cases when a bit number, a bank number, an input format or an output format are different. Here, for the sake of convenient explanation, an MPEG-2 data type, the most frequently adopted data type, is assumed to be employed. That is, IDCT unit 7 has a 9 bit output and a macroblock (MB) is composed of four 8×8 luminance blocks and two 8×8 chrominance blocks.

Figure 2A:
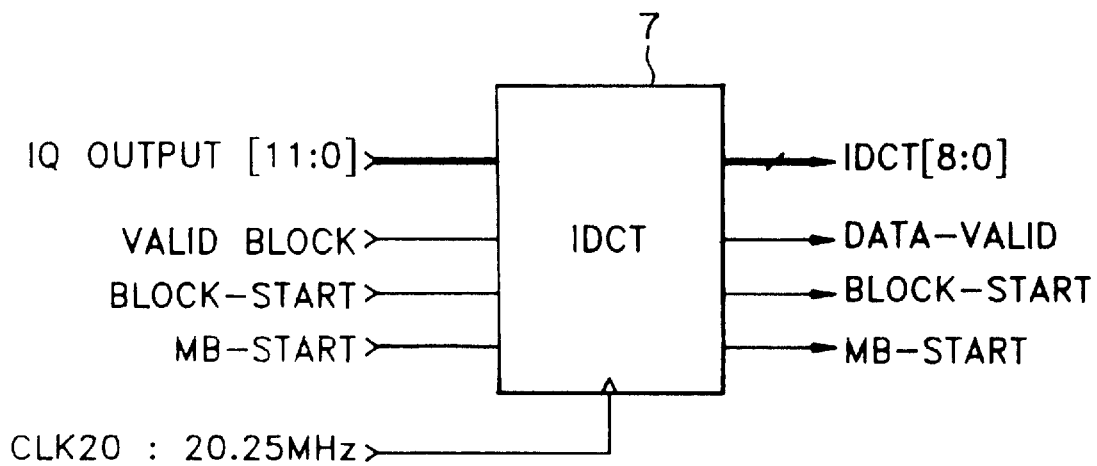
FIGS. 2A and 2B illustrate output picture data of an IDCT unit shown in FIG. 1, and memory banks of the IDCT unit, respectively.

FIG. 2A shows picture data outputs of IDCT unit 7, which is shown in FIG. 1. IDCT unit 7 includes a random access memory (RAM) having two memory banks BANK#1 and BANK#2 shown in FIG. 2B. A frame/field flag for a picture, which depends on the output format, identifies a frame by taking a "high (H)" value and identifies a field by taking a "low (L)" value. A DCT-type flag identifies a frame by the flag taking a "high (H)" value and identifies a field by the flag taking a "low (L)" value. Thus, the cumulative delay between a request and an acceptance is negligible in the case where the size of the IDCT output data is less than one macroblock.

Figure 2B:
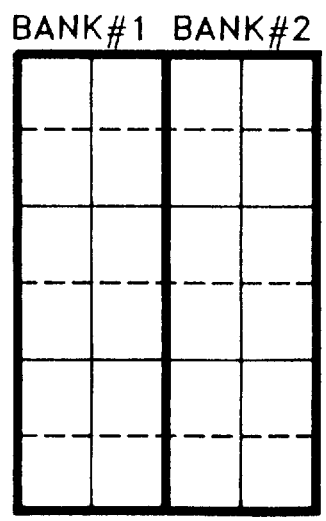
Figure 3A:
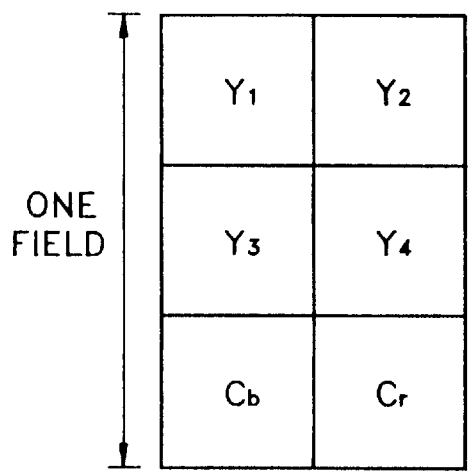
FIGS. 3A through 3C illustrate data formats for the respective types of memory banks shown in FIGs. 2A–2B.
Figure 3B:
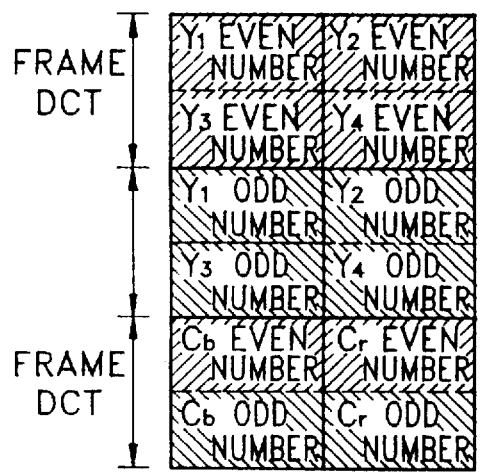
Figure 3C:
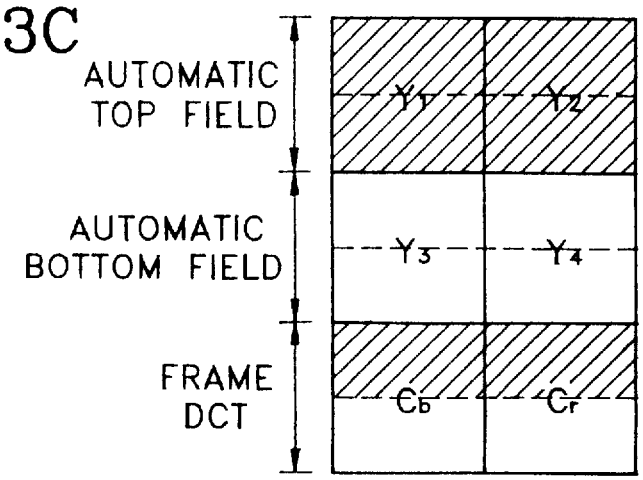

FIGS. 3A through 3C illustrate data formats for the respective types of memory banks shown in FIG. 2A–2B, in which FIG. 3A shows the data format in the case of a field picture and FIG. 3B shows the data format in the case of a frame picture. That is, in FIG. 3A the $Y_1$, $Y_3$ and Cb blocks are stored in memory bank #1, and $Y_2$, $Y_4$ and Cr blocks are stored in memory bank #2. In the case of a frame DCT mode, FIG. 3C shows the data formats for a frame picture and a field DCT mode, respectively. Here, the input picture data depending on the respective data formats can be unified into one type, which is realized by two methods. That is, the first method is to reorder data for each field or frame while writing the data to a memory, and the second method is to reorder data for each field or frame during reading of the data from a memory. In the present invention, the second method is adopted, however, the first method can be implemented by simply modifying the second method.

FIG. 4 is a block diagram of a output data sequence converting circuit according to the present invention, which is in the IDCT, illustrating the connections between the various components.

The output data sequence converting circuit according to the present invention largely includes a write controller 41, a read controller 43 and a first-in-first-out (FIFO) memory 45. An output port of write controller 41 is connected to input ports of read controller 43 and FIFO memory 45, respectively, and an output port of read controller 43 is connected to an input port of FIFO memory 45. Here, a RAM is employed as FIFO memory 45, which reduces the overall hardware size and allows for a compact design. Operation of write controller 41, read controller 43 and FIFO memory 45 is described below in detail with reference to FIGS. 5 through 14.

Figure 5:
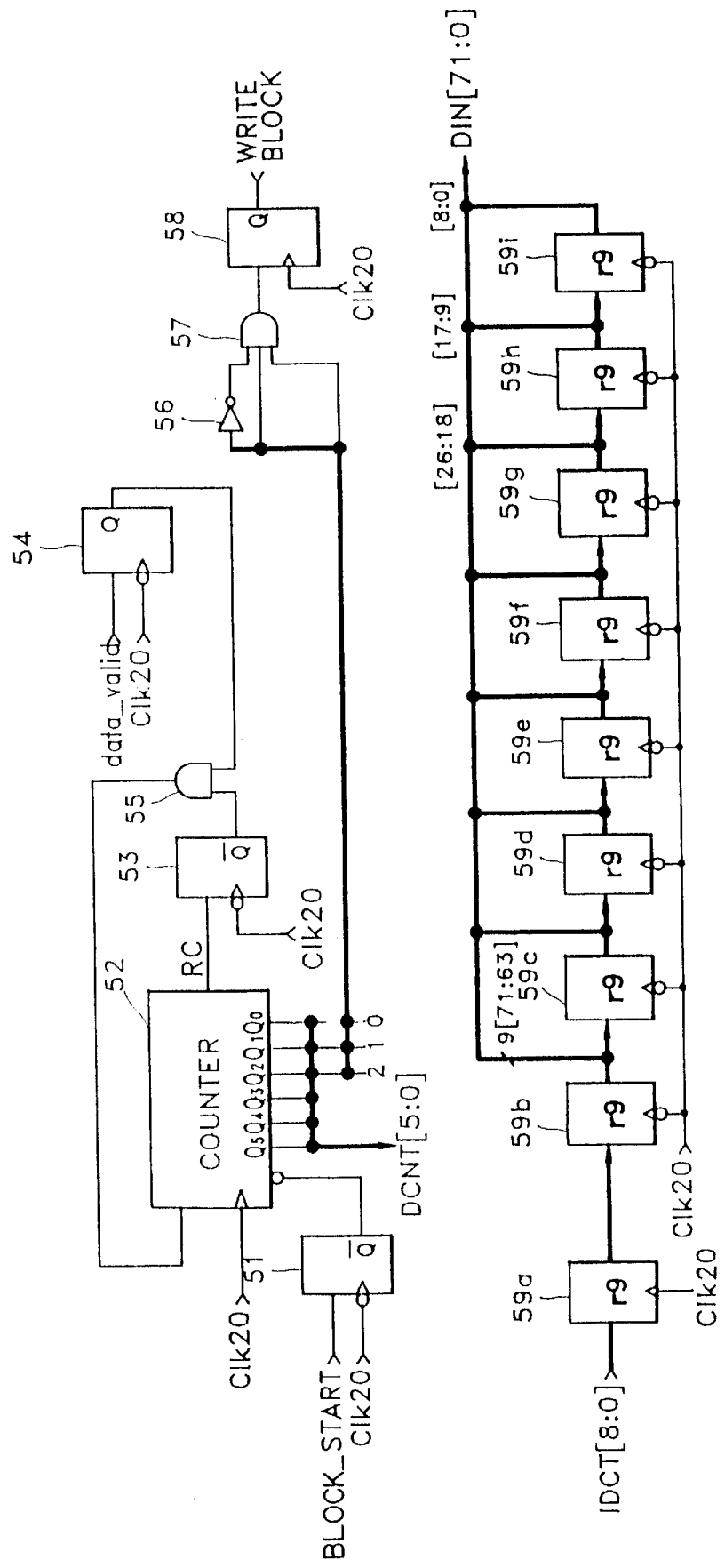
FIG. 5 is a detailed circuit diagram of a write control signal generator of a write controller shown in FIG. 4.
Figure 6:
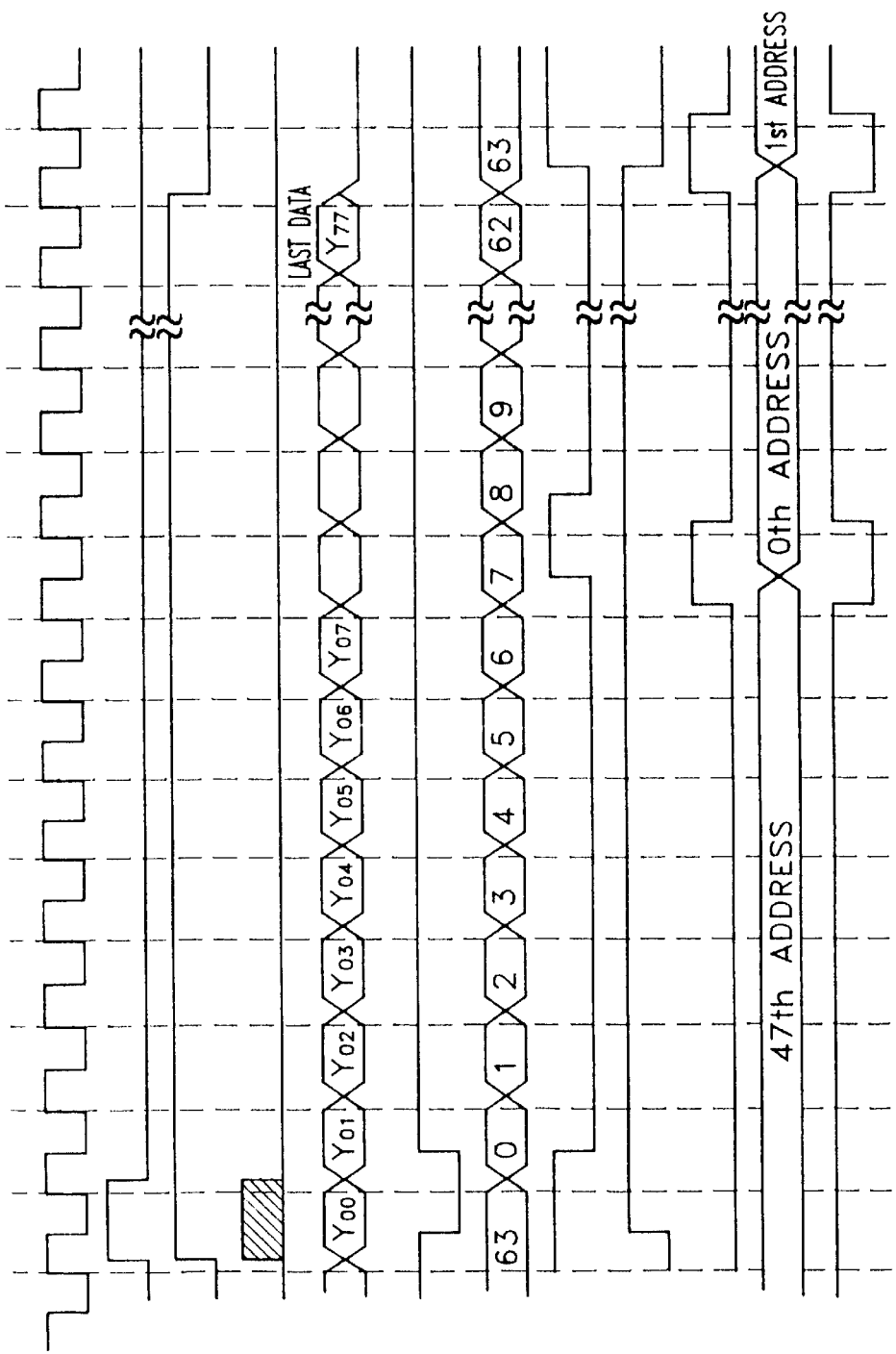
FIGS. 6A through 6L are timing diagrams of control signals generated in the write control signal generator shown in FIG. 5.
Figure 7:
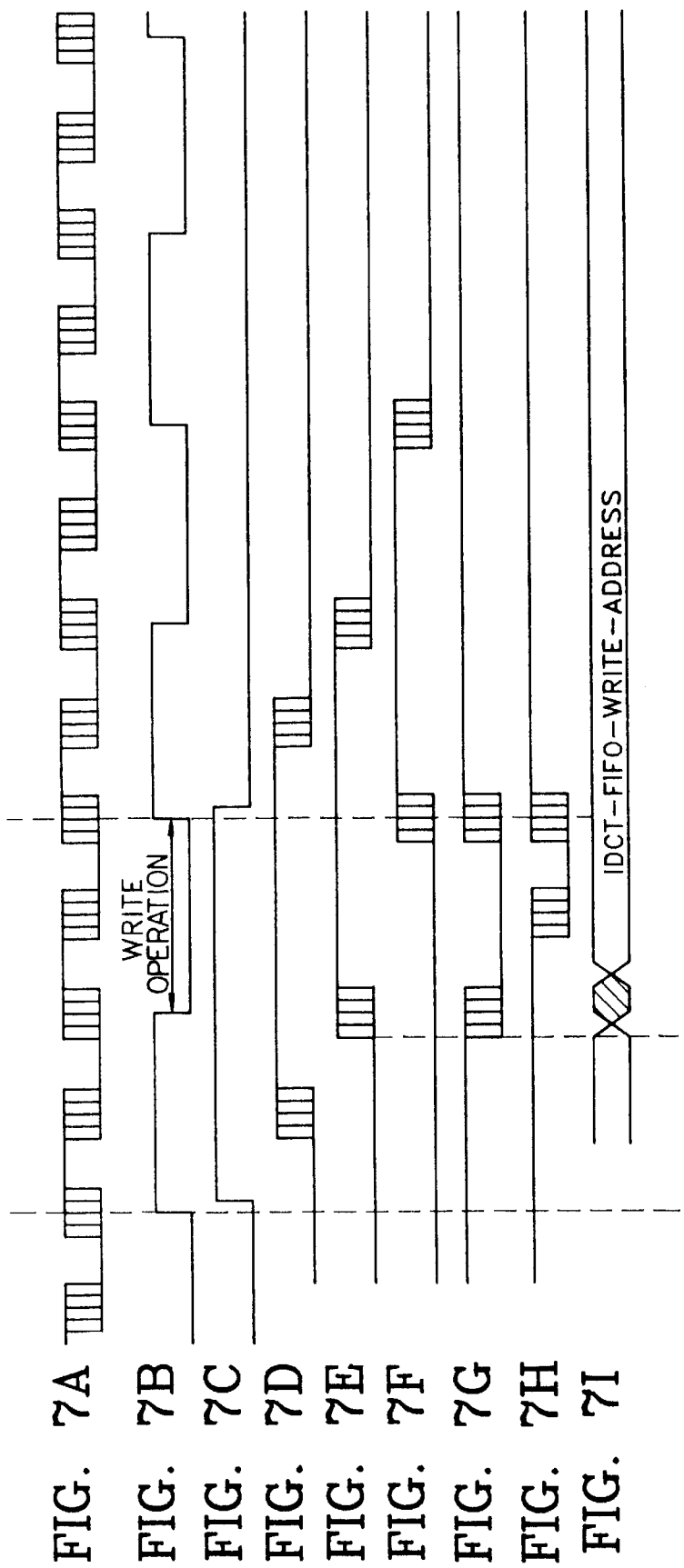
FIGS. 7A through 7I are detailed timing diagrams during write operation of the memory by the write controller shown in FIG. 4, using control signals generated in the write control signal generator shown in FIG. 5.

FIG. 5 is a detailed circuit diagram of a write control signal generator of write controller 41 shown in FIG. 4. The write control signal generator includes four D-flip flops 51, 53, 54 and 58, a counter 52, two AND gates 55 and 57, an inverter 56, and nine shift registers (SFT-REG) 59a through 59i.

FIGS. 6A through 6L are timing diagrams of control signals generated by the write control signal generator shown in FIG. 5. FIG. 6A illustrates a clock signal Clk2O. FIG. 6B illustrates a block start signal Block_start. FIG. 6C illustrates a data valid signal data_valid. FIG. 6D illustrates a macroblock start signal mb_start. FIG. 6E illustrates data IDCT[8:0] output from IDCT unit 7 (FIG. 1). FIG. 6F illustrates a signal obtaining by latching the block start signal Block_start at a falling edge of clock signal Clk2O (FIG. 6A) output from D-flip flop 51. FIG. 6G illustrates the DCNT[5:0] signal output from sync reset 6-bit counter 52. FIG. 6H illustrates a write block pulse output by latching the decoded clock signal DCNT [2:0]=7 at a falling edge of the clock signal Clk20 (FIG. 6A). FIG. 6I illustrates a signal obtained by latching the data valid signal data_valid (FIG. 6C) at a falling edge of the clock signal Clk20 (FIG. 6A) using third D-flip flop 54. FIG. 6J illustrates the write block signal output by latching the decoded clock signal DCNT [2:0]=6 at a rising edge of the clock signal Clk20 (FIG. 6A), which is an alternative of FIG. 6H. FIG. 6K illustrates a write address, and FIG. 6L illustrates the signal shown in FIG. 6J inverted.

FIGS. 7A through 7I are detailed timing diagrams during a write operation for writing to the memory under the control of the write controller shown in FIG. 8, which will be described later, and which uses write control signals generated by the write control signal generator shown in FIG. 5. FIG. 7A illustrates a clock signal Clk40. FIG. 7B illustrates a clock signal Clk20. FIG. 7C illustrates a write block signal input to D-flip flop D71, shown in FIG. 8. FIG. 7D illustrates an output signal (a) of D-flip flop D71, FIG. 7E illustrates an output signal (b) of D-flip flop D72, and FIG. 7F illustrates an output signal (c) of D-flip flop D73. FIG. 7G illustrates an read/write signal RW signal output from buffer B71. FIG. 7H illustrates a WCEN signal output from OR gate O71, and FIG. 7I illustrates a write address for the FIFO memory.

Figure 8:
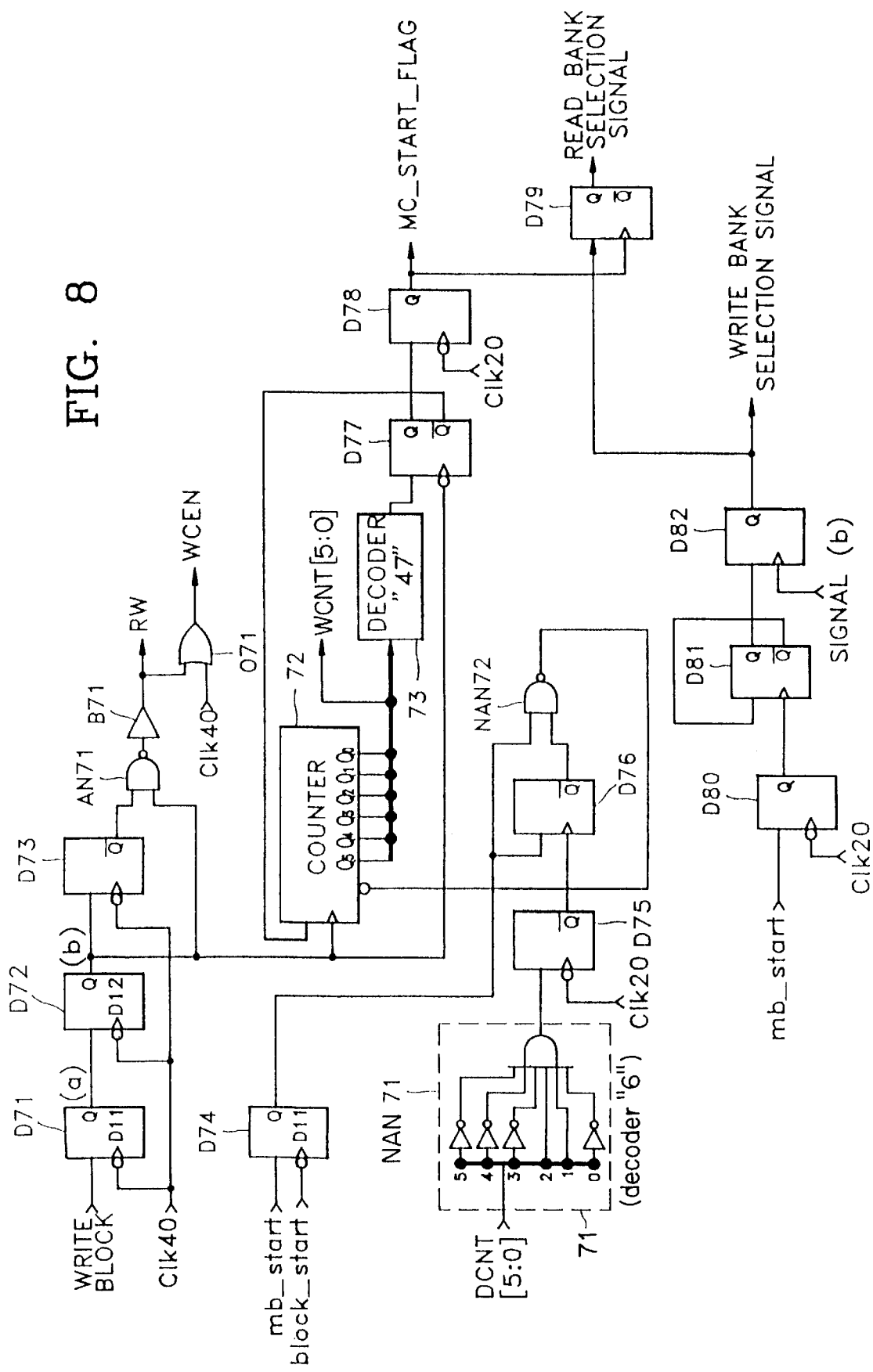
FIG. 8 is a detailed circuit diagram of the write controller shown in FIG. 4.
Figure 9:
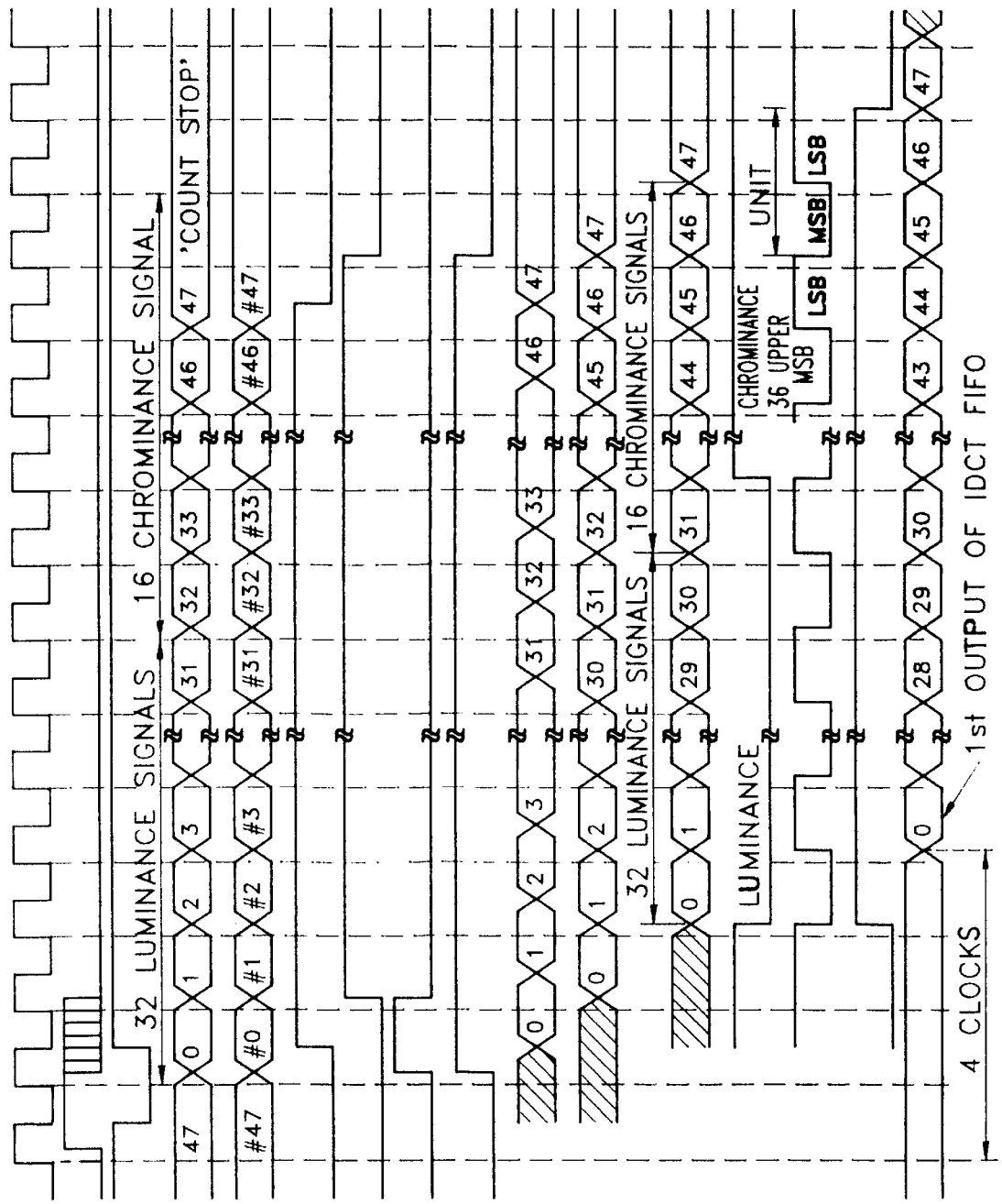
FIGS. 9A through 9P are timing diagrams of the control signals generated in the read controller shown in FIG. 4.
Figure 10:
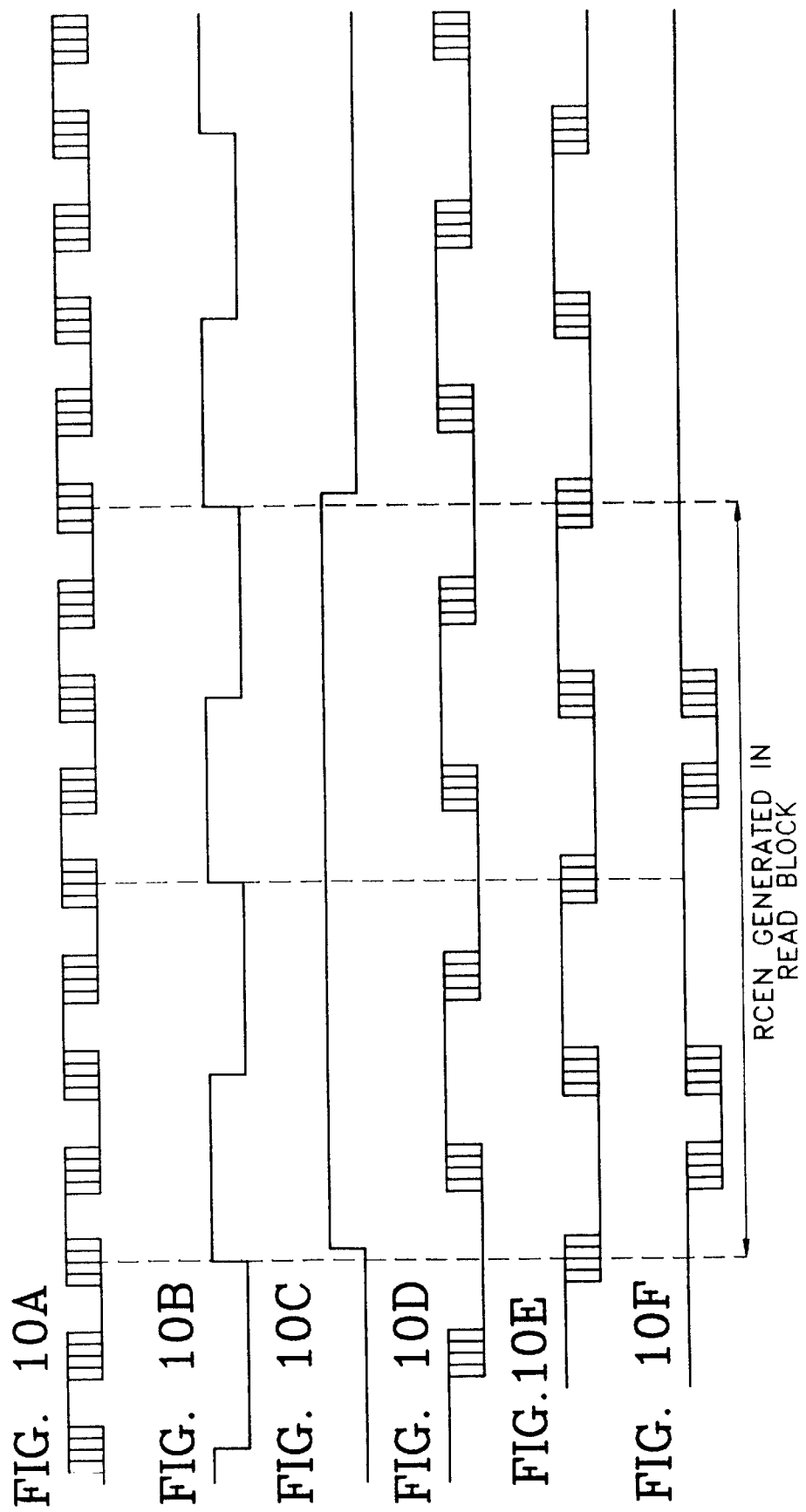
FIGS. 10A through 10F are detailed timing diagrams showing signals during a read operation of the memory, using the read control signals generated by read controller shown in FIG. 4.

FIG. 8 is a detailed circuit diagram of write controller 41 shown in FIG. 4, which includes twelve D-flip flops D71 through D82, two NAND gates NAN71 and NAN72, a buffer B71, an OR gate O71, a '6' decoder 71, a counter 72, and a '47' decoder 73. Here, the read bank selection signal output from D-flip flop D79 is a flag representing that the write operation in the current bank is complete. Also, the RW signal indicates a read operation in the case of the RW signal having a 'H' value, and a write operation in the case of the RW signal having a 'L' value. Here, '47' decoder 73 uses only the values 0 to 47 from among values of 0 to 63 of a WCNT [5:0 ] signal.

The operation of write controller 41 shown in FIG. 4 will now be described with reference to FIGS. 5 through 8.

First, a 1-pixel signal IDCT [8:0], comprised of nine bits of data, is output from IDCT unit 7 shown in FIG. 1 and input to shift register 59a depending on the clock signal Clk20 shown in FIG. 6A. The 1-pixel signal output from shift register 59a is input to eight shift registers 59b through 59i, respectively, according on the clock signal Clk20. In other words, since the 1-pixel signal is composed of 9 bits, a total of 72 bits of data, i.e., DIN [71:0] are formed from the outputs of eight shift registers 59b through 59i. These 72 bits of data DIN [71:0] are sequentially written to memory 45 shown in FIG. 4.

In this manner, if the 72-bit data, i.e., DIN [71:0] is prepared, DCNT [2:0]=6 output from counter 52 is decoded by inverter 56 and AND gate 57 and then is latched at a rising edge of clock signal Clk20 using fourth D-flip flop 58 to output the write block pulse shown in FIG. 6J. As an alternative, DCNT [2:0]=7 output from counter 52 is decoded by inverter 56 and AND gate 57 and then is latched at a falling edge of the clock signal Clk20 to output the write block pulse shown in FIG. 6H. In other words, the write block pulse is generated for every 8th data signal from the time when the first IDCT data signal is input. Control pulses shown in FIGS. 7A through 7I are generated based on the write block pulse.

The write address shown in FIG. 6K of memory 45 is generated by increasing the write counter output WCNT [5:0] one by one according to the rising edge of the write block pulse. If one macroblock is completely written, an mc_start_-flag signal is generated by D-flip flop D78 shown in FIG. 8, to be used as the request signal sent to other processing units.

Figure 14:
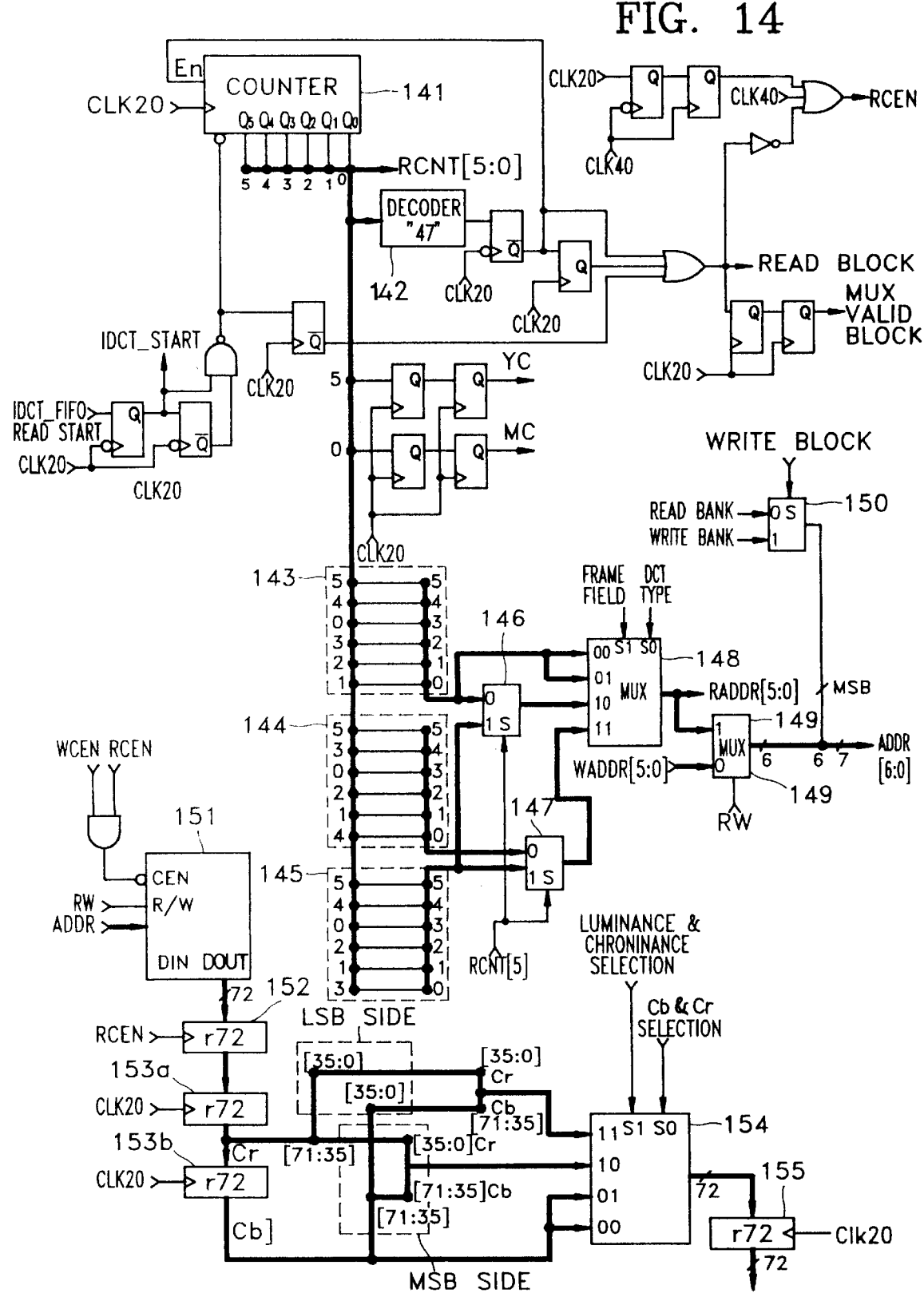
FIG. 14 is a detailed circuit diagram of the read controller shown in FIG. 4.

FIGS. 9A through 9P are timing diagrams of the read control signals generated in the read controller shown in FIG. 4, and shown in greater detail in FIG. 14. FIG. 9A illustrates a clock signal Clk20. FIG. 9B illustrates an IDCT_FIFO read start signal. FIG. 9C illustrates a signal output from a NAND gate which performs a NAND logic operation with respect to a signal output by once delaying the read start signal at a falling edge of clock signal Clk20 and a signal output by inverting, after twice delaying, the read start signal at a falling edge of clock signal Clk20. FIG. 9D illustrates an RCNT [5:0] signal. FIG. 9E illustrates an RADDR [5:0] signal. FIG. 9F illustrates a signal output from an inverting output port of a D-flip flop after performing a '47' decoding with respect to the RCNT [5:0] signal and then latching the same at the falling edge of clock signal Clk20. FIG. 9G illustrates a signal output from an output port of another D-flip flop after latching the signal shown in FIG. 9F at the rising edge of clock signal Clk20. FIG. 9H illustrates a signal output from an inverting output port of the D-flip flop after latching the signal shown in FIG. 9D at the rising edge of clock signal Clk20. FIG. 9I illustrates a read block signal. FIG. 9J illustrates an output of shift register 152. FIG. 9K illustrates an output of shift register 153a. FIG. 9L illustrates an output of shift register 153b. FIG. 9M illustrates a YC signal output after delaying the RCNT [5] signal by Clk20 using two D-flip flops, where the YC signal includes a luminance block of a 'L' state and a chrominance block of a 'H' state, which are multiplexed to generate a luminance/chrominance block. FIG. 9N illustrates an MC signal output after delaying the RCNT [0] by Clk20 using two D-flip flops, where the MC signal includes a most significant bit (MSB) signal of a 'L' state and a least significant bit (LSB) signal of a 'H' state, which are multiplexed to generate a chrominance selection reference signal. FIG. 9O illustrates a MUX valid block signal which is output after delaying the read block signal by using two D-flip flops. FIG. 9P illustrates data output from IDCT RAM 151.

FIGS. 10A through 10F are detailed timing diagrams showing signals during the read operation of the memory using the read control signals generated in read controller 43 shown in FIGS. 4 and 14. FIG. 10A illustrates a clock signal Clk40, FIG. 10B illustrates a clock signal Clk20, FIG. 10C illustrates a simplified read block, FIG. 10D illustrates a signal output by latching clock signal Clk20 at a falling edge of clock signal Clk40, FIG. 10E illustrates a signal output from an output port of a D-flip flop after latching the signal shown in FIG. 10D at a rising edge of clock signal Clk40, and FIG. 10F illustrates an RCEN signal, respectively.

Figure 11:
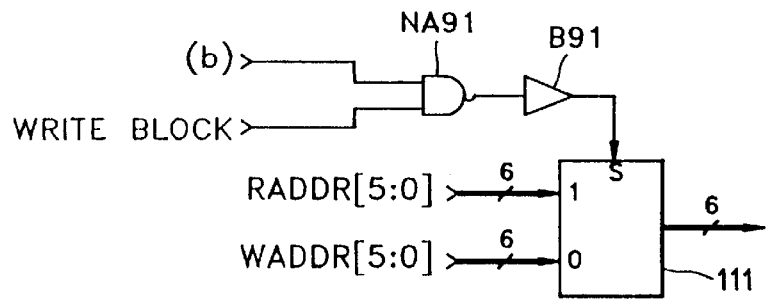
FIG. 11 shows an example of an implementation of a mode determining circuit for determining a write/read mode of the memory shown in FIG. 4.

FIG. 11 shows an example of the implementation of a mode determining circuit for determining a write/read mode of memory 45 shown in FIG. 4, which includes an NAND gate (NA91); a buffer B91 and a multiplexer 111.

Figure 12:
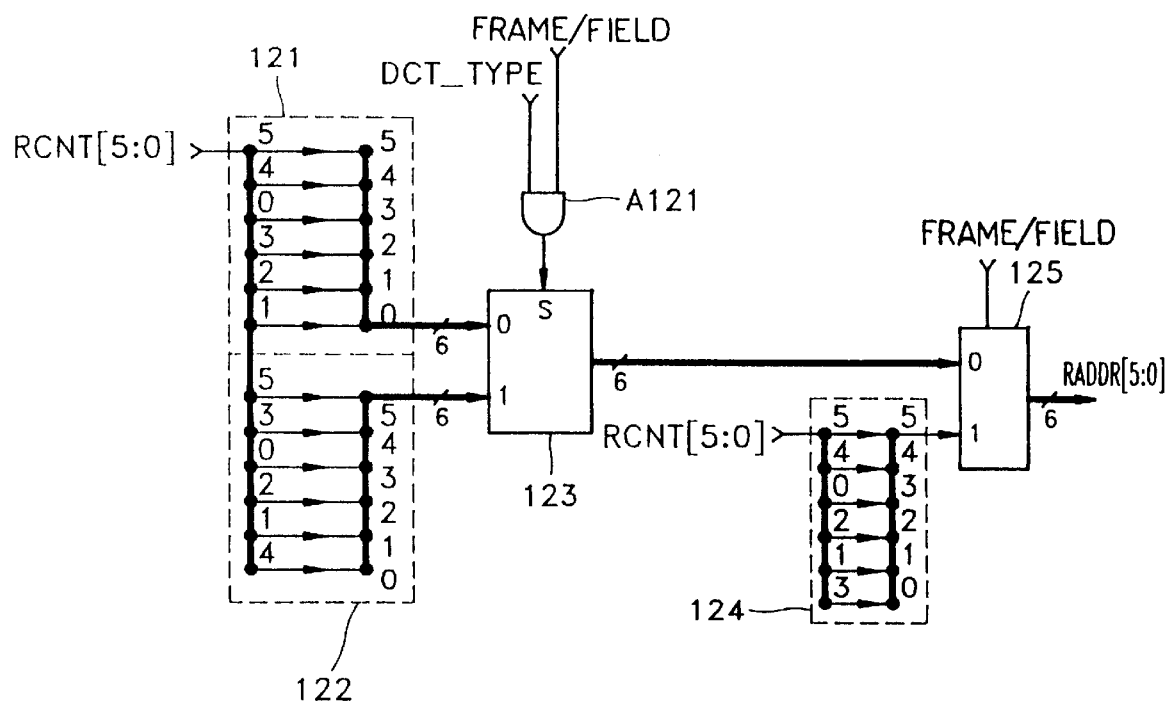
FIG. 12 shows an example of an implementation of a reordering circuit in the read controller shown in FIG. 4.

FIG. 12 shows an example of the implementation of a reordering circuit in read controller 43 shown in FIG. 4, which includes a basic form output unit 121, a luminance converter 122, a chrominance converter 124, two multiplexers 123 and 125 and an AND gate A121.

Now, operation of two multiplexers 123 and 125 will be described.

Irrespective of a 'high' or 'low' dct_type signal input to AND gate A121, if the frame/field signal is 'low,' multiplexer 123 selects a signal output from basic form output unit 121. If the frame/field signal is 'high' and the dct_type signal is 'low,' multiplexer 123 selects an output of chrominance converter 124. If the frame/field signal is 'high' and the dct_type signal is 'high,' multiplexer 123 selects an output of luminance converter 122 and then multiplexer 125 selects the output of chrominance converter 124.

FIGS. 13A through 13D are re-multiplexing timing diagrams of a chrominance signal output from the read controller shown in FIG. 4, in which FIG. 13A illustrates a clock signal Clk20, FIG. 13B illustrates an RCNT [3:0] signal, FIG. 13C illustrates a signal output by delaying once the DOUT signal output from IDCT RAM 151 at a rising edge of the clock signal Clk20, and FIG. 13D illustrates a signal output by delaying twice the DOUT signal output from IDCT RAM 151 at a rising edge of the clock signal Clk20, respectively.

FIG. 14 is a detailed circuit diagram of the read controller shown in FIG. 4, which includes a counter 141, a '47' decoder 142, a basic form output unit 143, a luminance converter 144, a chrominance converter 145, six multiplexers 146 through 150 and 154, a plurality of logic gates, e.g., D-flip flops, NAND gates, OR gates.

Although not shown, a frame/field input signal or dct_type signal is output using the idct_start signal as a clock signal. Here, IDCT RAM 151 is composed of two banks.

The operation of read controller 43 of FIG. 4 will now be described with reference to FIGS. 8 through 14.

First, an external request processor (not shown) receives a request signal output from write controller 41 (FIG. 4) to generate an accept signal to be applied to read controller 43 of FIGS. 4 and 14, which is defined by an idct-FIFO read start signal. If the idct-FIFO read start signal is input to read controller 43 of FIGS. 4 and 14, the read count is increased by one and starts the write operation.

Since the write and read operations are always concurrently performed, the overall timing chart is constructed such that the read operation is performed during a high period of the system clock Clk20 and the write operation is performed during a low period thereof.

The sequentially generated read addresses are read separately depending on the input data mode, as described above.

The following Tables 1 through 4 show reordering of the sequence of reading data with respect to a field picture, a frame picture and frame DCT. In these cases, the output type is fixed by fields. However, a set memory reordering is more applicable by other methods. In Tables 2 through 4, the upper two lines indicate the luminance signals stored in the top portion of the memory banks (i.e., $Y_1$ and $Y_2$) and the middle portion of the memory banks (i.e., $Y_3$ and $Y_4$), respectively. The lower line of those tables indicates the addresses for Cr and Cb. For example, in Table 2 the first eight columns in the lower line indicate the upper portion of Cr and Cb, and the latter eight columns indicate the lower portions of Cr and Cb, respectively.

Table 1 indicates the addresses in the memory for the case of a field picture as shown in FIG. 3A. Table 2 indicates a read address sequence for the case of the field picture. Table 3 indicates a read address sequence of a frame picture for the case of a field DCT, where the sequence of luminance signals is the same as in Table 2, although the sequence of chrominance signals is different. Table 4 indicates a read address sequence of a frame picture for the case of a frame DCT, where the sequences of luminance signals and chrominance signals are all different as compared to Table 2.

TABLE 1

| 0 | Y1 | 8 | Y2 |
|---|---|---|---|
| 1 | MSB '000' | 9 | MSB '001' |
| 2 | | 10 | |
| 3 | | 11 | |
| 4 | | 12 | |
| 5 | | 13 | |
| 6 | | 14 | |
| 7 | | 15 | |
| 16 | Y3 | 24 | Y4 |
| 17 | MSB '010' | 25 | MSB '011' |
| 18 | | 26 | |
| 19 | | 27 | |
| 20 | | 28 | |
| 21 | | 29 | |
| 22 | | 30 | |
| 23 | | 31 | |
| 32 | Cb | 40 | Cr |
| 33 | MSB '100' | 41 | MSB '101' |
| 34 | | 42 | |
| 35 | | 43 | |
| 36 | | 44 | |
| 37 | | 45 | |
| 38 | | 46 | |
| 39 | | 47 | |

TABLE 2

| 0 | 8 | 1 | 9 | 2 | 10 | 3 | 11 | 4 | 12 | 5 | 13 | 6 | 14 | 7 | 15 |
|---|---|---|---|---|---|---|---|---|---|---|---|---|---|---|---|
| 16 | 24 | 17 | 25 | 18 | 26 | 19 | 27 | 20 | 28 | 21 | 29 | 22 | 30 | 23 | 31 |
| 32 | 40 | 33 | 41 | 34 | 42 | 35 | 43 | 36 | 44 | 37 | 45 | 38 | 46 | 39 | 47 |

TABLE 3

| 0 | 8 | 1 | 9 | 2 | 10 | 3 | 11 | 4 | 12 | 5 | 13 | 6 | 14 | 7 | 15 |
|---|---|---|---|---|---|---|---|---|---|---|---|---|---|---|---|
| 16 | 24 | 17 | 25 | 18 | 26 | 19 | 27 | 20 | 28 | 21 | 29 | 22 | 30 | 23 | 31 |
| 32 | 40 | 34 | 42 | 36 | 44 | 38 | 46 | 33 | 41 | 35 | 43 | 37 | 45 | 39 | 47 |

TABLE 4

| 0 | 8 | 2 | 10 | 4 | 12 | 6 | 14 | 16 | 24 | 18 | 26 | 20 | 28 | 22 | 30 |
|---|---|---|---|---|---|---|---|---|---|---|---|---|---|---|---|
| 1 | 9 | 3 | 11 | 5 | 13 | 7 | 15 | 17 | 25 | 19 | 27 | 21 | 29 | 23 | 31 |
| 32 | 40 | 34 | 42 | 36 | 44 | 38 | 46 | 33 | 41 | 35 | 43 | 37 | 45 | 39 | 47 |

The following Tables 5 and 6 indicate the types of tables for reordering, like in Tables 2 through 4, in which the upper line of each of Tables 5 and 6 indicates RCNT [3:0], and the lower line indicates RADDR [3:0], respectively.

TABLE 5

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 8 | 1 | 9 | 2 | 10 | 3 | 11 | 4 | 12 | 5 | 13 | 6 | 14 | 7 | 15 |

TABLE 6

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 8 | 2 | 10 | 4 | 12 | 6 | 14 | 1 | 9 | 3 | 11 | 5 | 13 | 7 | 15 |

The following Tables 7 through 9 illustrate the reordering, which can be easily implemented by exchanging bits.

TABLE 7

| RCNT [3:0] | RADDR [3:0] | RCNT [3:0] 3 2 1 0 | RADDR [3:0] 3 2 1 0 |
|---|---|---|---|
| 0 | 0 | 0 0 0 0 | 0 0 0 0 |
| 1 | 8 | 0 0 0 1 | 1 0 0 0 |
| 2 | 1 | 0 0 1 0 | 0 0 0 1 |
| 3 | 9 | 0 0 1 1 | 1 0 0 1 |
| 4 | 2 | 0 1 0 0 | 0 0 1 0 |
| 5 | 10 | 0 1 0 1 | 1 0 1 0 |
| 6 | 3 | 0 1 1 0 | 0 0 1 1 |
| 7 | 11 | 0 1 1 1 | 1 0 1 1 |
| 8 | 4 | 1 0 0 0 | 0 1 0 0 |
| 9 | 12 | 1 0 0 1 | 1 1 0 0 |
| 10 | 5 | 1 0 1 0 | 0 1 0 1 |
| 11 | 13 | 1 0 1 1 | 1 1 0 1 |
| 12 | 6 | 1 1 0 0 | 0 1 1 0 |
| 13 | 14 | 1 1 0 1 | 1 1 1 0 |
| 14 | 7 | 1 1 1 0 | 0 1 1 1 |
| 15 | 15 | 1 1 1 1 | 1 1 1 1 |

TABLE 8

| RCNT [3:0] | RADDR [3:0] | RCNT [3:0] 3 2 1 0 | RADDR [3:0] 3 2 1 0 |
|---|---|---|---|
| 0 | 0 | 0 0 0 0 | 0 0 0 0 |
| 1 | 8 | 0 0 0 1 | 1 0 0 0 |
| 2 | 2 | 0 0 1 0 | 0 0 1 0 |
| 3 | 10 | 0 0 1 1 | 1 0 1 0 |

TABLE 8-continued

| RCNT [3:0] | RADDR [3:0] | RCNT [3:0] 3 2 1 0 | RADDR [3:0] 3 2 1 0 |
|---|---|---|---|
| 4 | 4 | 0 1 0 0 | 0 1 0 0 |
| 5 | 12 | 0 1 0 1 | 1 1 0 0 |
| 6 | 6 | 0 1 1 0 | 0 1 1 0 |
| 7 | 14 | 0 1 1 1 | 1 1 1 0 |
| 8 | 1 | 1 0 0 0 | 0 0 0 1 |
| 9 | 9 | 1 0 0 1 | 1 0 0 1 |
| 10 | 3 | 1 0 1 0 | 0 0 1 1 |
| 11 | 11 | 1 0 1 1 | 1 0 1 1 |
| 12 | 5 | 1 1 0 0 | 0 1 0 1 |
| 13 | 13 | 1 1 0 1 | 1 1 0 1 |
| 14 | 7 | 1 1 1 0 | 0 1 1 1 |
| 15 | 15 | 1 1 1 1 | 1 1 1 1 |

TABLE 9

| RCNT [4:0] | RADDR [4:0] | RCNT [4:0] 4 3 2 1 0 | RADDR [4:0] 4 3 2 1 0 |
|---|---|---|---|
| 0 | 0 | 0 0 0 0 0 | 0 0 0 0 0 |
| 1 | 8 | 0 0 0 0 1 | 0 1 0 0 0 |
| 2 | 2 | 0 0 0 1 0 | 0 0 0 1 0 |
| 3 | 10 | 0 0 0 1 1 | 0 1 0 1 0 |
| 4 | 4 | 0 0 1 0 0 | 0 0 1 0 0 |
| 5 | 12 | 0 0 1 0 1 | 0 1 1 0 0 |
| 6 | 6 | 0 0 1 1 0 | 0 0 1 1 0 |
| 7 | 14 | 0 0 1 1 1 | 0 1 1 1 0 |
| 8 | 16 | 0 1 0 0 0 | 1 0 0 0 0 |
| 9 | 24 | 0 1 0 0 1 | 1 1 0 0 0 |
| 10 | 18 | 0 1 0 1 0 | 1 0 0 1 0 |
| 11 | 26 | 0 1 0 1 1 | 1 1 0 1 0 |
| 12 | 20 | 0 1 1 0 0 | 1 0 1 0 0 |
| 13 | 28 | 0 1 1 0 1 | 1 1 1 0 0 |
| 14 | 22 | 0 1 1 1 0 | 1 0 1 1 0 |
| 15 | 30 | 0 1 1 1 1 | 1 1 1 1 0 |
| 16 | 1 | 1 0 0 0 0 | 0 0 0 0 1 |
| 17 | 9 | 1 0 0 0 1 | 0 1 0 0 1 |
| 18 | 3 | 1 0 0 1 0 | 0 0 0 1 1 |
| 19 | 11 | 1 0 0 1 1 | 0 1 0 1 1 |
| 20 | 5 | 1 0 1 0 0 | 0 0 1 0 1 |
| 21 | 13 | 1 0 1 0 1 | 0 1 1 0 1 |
| 22 | 7 | 1 0 1 1 0 | 0 0 1 1 1 |
| 23 | 15 | 1 0 1 1 1 | 0 1 1 1 1 |
| 24 | 17 | 1 1 0 0 0 | 1 0 0 0 1 |
| 25 | 25 | 1 1 0 0 1 | 1 1 0 0 1 |
| 26 | 19 | 1 1 0 1 0 | 1 0 0 1 1 |
| 27 | 27 | 1 1 0 1 1 | 1 1 0 1 1 |
| 28 | 21 | 1 1 1 0 0 | 1 0 1 0 1 |
| 29 | 29 | 1 1 1 0 1 | 1 1 1 0 1 |
| 30 | 23 | 1 1 1 1 0 | 1 0 1 1 1 |
| 31 | 31 | 1 1 1 1 1 | 1 1 1 1 1 |

Figure 13:
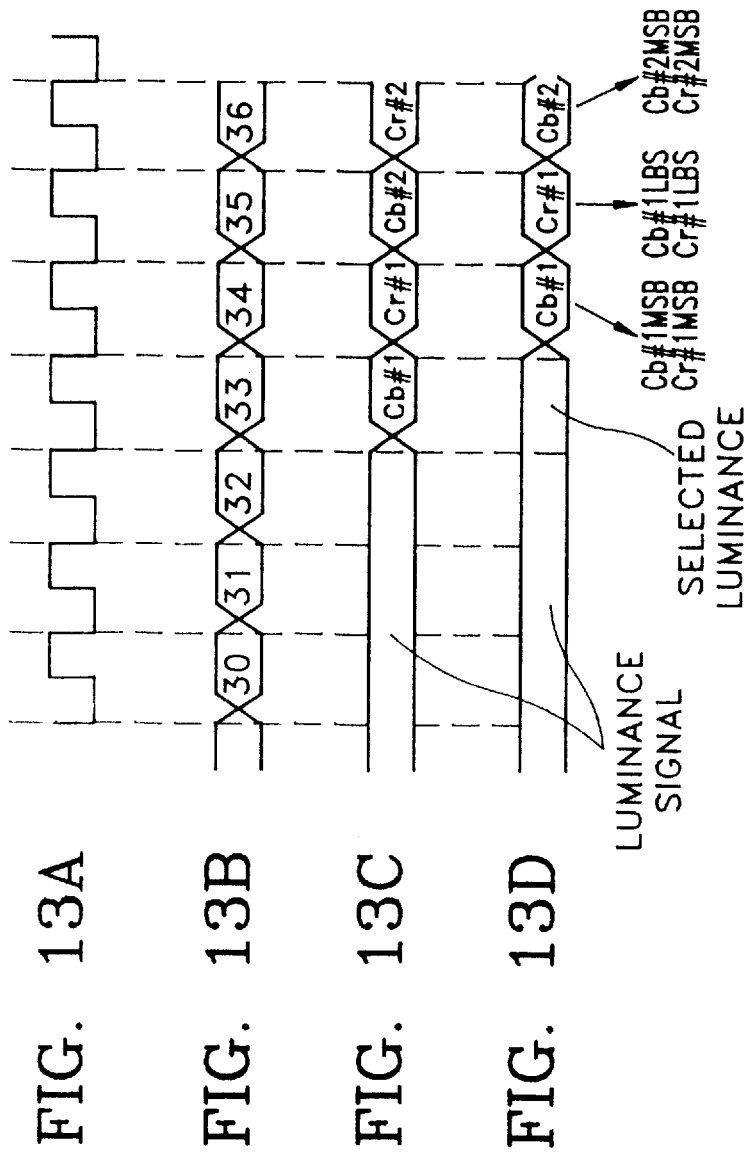
FIGS. 13A through 13D are re-multiplexing timing diagrams of a chrominance signal output from the read controller shown in FIG. 4.

The output signal of memory 45 of FIG. 4 is sequentially output for the case of a luminance signal. However, it is desirable that every four pixels of Cb and Cr are multiplexed for the case of a chrominance signal. FIG. 13 illustrates an example of multiplexing the chrominance signal, in which a delay due to multiplexing the chrominance signal is generated. This delay can be removed by matching the delays of the chrominance and luminance signals.

According to another embodiment, a write address converting method can be used instead of the read address converting method. Also, multiplexing of the chrominance signal can be processed in another way. The number of packs of pixels can take another value rather than 8 pixels. Also, more than two IDCT memory banks can be used. Further, a FIFO rather than a RAM memory can be used.

As described above, according to the output data sequence converting method and circuit of the present invention, since the sequences of a picture signal output from an inverse IDCT and those output from a motion compensator are matched by an address mapping method, a separate format converter is not required. Thus, the complexity of post-processing is reduced. Also, the circuit always operates without a processing delay due to the time gap between the request operation and accept operation. A simplified interfacing circuit is provided by mapping a luminance output signal and a chrominance output signal and a compact hardware implementation can be achieved.

Although preferred embodiments of the present invention have been disclosed for illustrative purposes, those skilled in the art will appreciate that various modifications, additions and substitutions are possible, without departing from the scope and spirit of the invention as set forth in the accompanying claims.

What is claimed is:

1. A data outputting sequence converting method for use with an inverse discrete cosine transform (IDCT) for matching output sequences of IDCT-performed current frame data and restored data of a motion-compensated current frame, said method comprising the steps of:

a) packing the IDCT-performed data for each pixel in a predetermined unit, and writing the packed data in a memory and generating a read request signal;

b) generating an accept signal in response to said read request signal and reading said packed data from said memory; and c) converting the format of said packed data read from said memory, wherein said steps a)-c) are performed in parallel.

2. A data outputting sequence converting method as claimed in claim 1, wherein said writing step comprises the sub-steps of:

a1) generating said read request signal if said IDCT-performed data is completely stored in said memory in said predetermined unit; and a2) continuously performing a write operation on said memory, after writing a plurality of pixels for said IDCT-performed data in said memory in said predetermined unit.

3. A data outputting sequence converting method as claimed in claim 1, wherein said memory is divided into two banks and each bank is defined by six 8×8-DCT blocks, and wherein said read request signal is generated when a write operation is completed for one of said banks.

4. A data outputting sequence converting method as claimed in claim 1, wherein said step a) comprises the sub-step of generating write addresses, said step b) comprises the sub-step of generating read addresses, and said step c) comprises the sub-steps of:

c1) sequentially ordering said write addresses; and c2) reordering said read addresses.

5. A data outputting sequence converting method as claimed in claim 1, wherein said step a) comprises the sub-step of generating write addresses, said step b) comprises the sub-step of generating read addresses, and said step c) comprises the sub-steps of:

c1) sequentially ordering said read addresses; and c2) reordering said write addresses.

6. A data outputting sequence converting circuit for use with an inverse discrete cosine transform (IDCT) for matching output sequences of IDCT-performed current frame data and restored data of a motion-compensated current frame, said circuit comprising:

a memory for storing the IDCT-performed data packed in a predetermined unit;

a write controller for generating a write address and a write control signal for controlling the operation of writing said IDCT-performed data in said memory and generating a read request signal upon completion of said write operation; and a read controller for receiving an accept signal for in response thereto and generating a read address and a read control signal for reading said IDCT-performed data from said memory, wherein said accept signal is generated in response to said read request signal.

7. A data outputting sequence converting circuit as claimed in claim 6, wherein said write controller generates said read request signal when said IDCT-performed data is completely stored in said memory in said predetermined unit, and concurrently performs a continuous write operation on said memory, after a plurality of pixels for said IDCT-performed data are written in said memory in said predetermined unit.

8. A data outputting sequence converting circuit as claimed in claim 7, wherein said memory is divided into two banks and each bank is defined by six 8×8-DCT blocks, and wherein said read request signal is generated when a write operation is completed for one of said banks.

9. A data outputting sequence converting circuit as claimed in claim 6, wherein said write controller generates other write addresses and said read controller generates other read addresses, and wherein said write address is sequentially ordered among said other write addresses and said read address is reordered among said other read addresses.

10. A data outputting sequence converting circuit as claimed in claim 6, wherein said write controller generates other write addresses and said read controller generates other read addresses, and wherein said read address is sequentially ordered among said other read addresses and said write write address is reordered among said other write addresses.

* * * * *